United States Patent
Zhao et al.

(10) Patent No.: US 9,337,963 B2
(45) Date of Patent: May 10, 2016

(54) TRANSMISSION METHOD AND APPARATUS FOR MULTI-ANTENNA RETRANSMISSION

(75) Inventors: Zheng Zhao, Beijing (CN); Xufeng Zheng, Beijing (CN)

(73) Assignee: Samsung Electronics Co., Ltd (KR)

( * ) Notice: Subject to any disclaimer, the term of this patent is extended or adjusted under 35 U.S.C. 154(b) by 696 days.

(21) Appl. No.: 13/266,688

(22) PCT Filed: Apr. 27, 2010

(86) PCT No.: PCT/KR2010/002658
§ 371 (c)(1),
(2), (4) Date: Oct. 27, 2011

(87) PCT Pub. No.: WO2010/126293
PCT Pub. Date: Nov. 4, 2010

(65) Prior Publication Data
US 2012/0045021 A1    Feb. 23, 2012

(30) Foreign Application Priority Data
Apr. 27, 2009    (CN) .......................... 2009 1 0137969

(51) Int. Cl.
*H04L 27/00* (2006.01)
*H03K 9/06* (2006.01)
(Continued)

(52) U.S. Cl.
CPC ............ *H04L 1/1893* (2013.01); *H04B 7/0613* (2013.01); *H04L 1/06* (2013.01)

(58) Field of Classification Search
CPC ... H04L 1/0054; H04L 27/2601; H04L 25/02; H04L 27/2649; H04L 5/0048; H04L 7/042; H04L 1/0003; H04L 1/006; H04L 1/1864; H04L 1/201; H04L 1/206; H04L 25/0202; H04L 25/03197; H04L 25/03866; H04L 25/03891; H04L 25/03898; H04L 25/03923
USPC ......... 375/219, 220, 222, 259–261, 268, 267, 375/269–278, 283, 295, 298, 299, 300–311, 375/316, 320, 321, 322, 340–344, 221, 211, 375/324, 329, 330, 331, 332, 333, 346–349, 375/356, 358; 370/203, 204, 205, 206, 208, 370/215, 310, 315, 319, 483, 482, 501; 455/39, 61, 63.1, 73, 91, 101, 103, 455/106, 110, 130, 132, 205

See application file for complete search history.

(56) References Cited

U.S. PATENT DOCUMENTS

| | | | |
|---|---|---|---|
| 2003/0112880 A1 | 6/2003 | Walton et al. | |
| 2005/0097424 A1 | 5/2005 | Golitschek et al. | |

(Continued)

FOREIGN PATENT DOCUMENTS

| | | |
|---|---|---|
| CN | 1426641 | 6/2003 |
| CN | 1582540 | 2/2005 |

(Continued)

OTHER PUBLICATIONS

PCT/ISA/237 Written Opinion issued on PCT/KR2010/002658 (pp. 3).

(Continued)

*Primary Examiner* — Linda Wong
(74) *Attorney, Agent, or Firm* — The Farrell Law Firm, P.C.

(57) ABSTRACT

A transmission method for multi-antenna retransmission is provided, comprising steps of: generating the bits to be transmitted by respective antennas; mapping the bits to be transmitted by the respective antennas into symbols; and multiplying by a constant the vector constituted by the mapped symbols transmitted by multiple antennas, wherein the resulting vector is orthogonal to the matrix constituted by the symbols previously transmitted by multiple antennas, and transmitting the orthogonal symbols. According to the method of the present invention, the remapped symbols transmitted by the respective antennas and the symbols previously transmitted by the respective antennas constitute a matrix that has an orthogonal property. The orthogonal property can be used to effectively detect signals. In addition, the method has a reception algorithm with low complexity and brings about significant performance gains over conventional methods.

9 Claims, 2 Drawing Sheets

(51) Int. Cl.
*H04L 5/12* (2006.01)
*H04L 1/18* (2006.01)
*H04L 1/06* (2006.01)
*H04B 7/06* (2006.01)

(56) References Cited

U.S. PATENT DOCUMENTS

2005/0281350 A1* 12/2005 Chae et al. .................... 375/267
2006/0274846 A1* 12/2006 Bauch ........................... 375/267
2006/0291582 A1* 12/2006 Walton et al. ................. 375/267
2009/0116375 A1   5/2009 Yang

FOREIGN PATENT DOCUMENTS

| CN | 1969522 | 5/2007 |
| CN | 101170335 | 4/2008 |
| CN | 101183919 | 5/2008 |
| KR | 1020050079392 | 8/2005 |
| KR | 1020060029061 | 4/2006 |
| KR | 1020080090889 | 10/2008 |
| WO | WO 2006/002550 | 1/2006 |
| WO | WO 2007123904 | 11/2007 |

OTHER PUBLICATIONS

PCT/ISA/210 Search Report issued on PCT/KR2010/002658 (pp. 3).
Lori A. Dalton et al., "A Full-Rate, Full-Diversity Four-Antenna Quasi-Orthogonal Space-Time Block Code", IEEE Transactions on Wireless Communications, Mar. 1, 2005.
Siavash M. Alamouti, "A Simple Transmit Diversity Technique for Wireless Communications", IEEE Journal on Select Areas in Communications, Oct. 1, 1998.
European Search Report dated Oct. 29, 2014 issued in counterpart application No. 10769938.1-1855.
Chinese Office Action dated Jul. 23, 2014 issued in counterpart application No. 200910137969.2.

* cited by examiner

TRANSMISSION METHOD AND APPARATUS FOR MULTI-ANTENNA RETRANSMISSION

TECHNICAL FIELD

The present invention relates to wireless mobile communication, and particularly to a transmission method and apparatus for multi-antenna retransmission.

BACKGROUND ART

HARQ is an error control technique also known as Hybrid Automatic Repeat request, the purpose of which is to guarantee information reliability. In the HARQ, a receiving end firstly performs forward error correction (FEC). If correct modulation still cannot be implemented, a transmitting end is required to retransmit data. The HARQ therefore avoids shortcomings that the FEC requires complicated decoding equipment and that information consistency is poor in Automatic Repeat reQuest (ARQ) and can set a bit error rate of the whole system to a very low level.

Constellation Remapping (CoRe) also plays an important role in high order modulation HARQ. In order not to increase a bandwidth and thereby to increase a data transmission rate, $M^{th}$-order quadrature amplitude modulation (M-QAM) solutions are often adopted in a mobile communication system. However, high order modulation itself is a type of unequal error protection modulation. For M>4, respective bits mapped onto M-QAM symbols have different performances of bit error rate (BER). Inner points in the constellation have small energy and are susceptible to fading. Bits that constitute these symbols have poor bit reliability. In contrast, bits that constitute outer points have good bit reliability. CoRe is just intended to avoid the problem that some bits are always subject to fading. Constellation positions corresponding to respective symbols in retransmission are changed so that the bit reliability after demodulation and combination at the receiving end tends to be even and is improved as a whole, thereby improving system throughput.

For a multi-antenna system, in addition to considering the bit reliability for the high order modulation, a characteristic of multi-antenna space diversity should also be utilized in the CoRe. That is, if the second transmission is performed, after multi-antenna bit mapping, the same transmission bit is placed on a different antenna from that in the first transmission.

We now explain this with two-antenna QPSK as an example. It is assumed that the bit sequence to be transmitted is $b_0 b_1 b_2 b_3$ and constellation mappings at the first transmission and the retransmission are performed in accordance with Table 1.

There are 2 approaches for implementing this mapping method. The first one consists in steps of adjusting, based on Table 1, the order of the bits to be sent, and adopting the same constellation in each transmission to modulate the bits and then send them. The second one consists in firstly allocating the respective bits to respective antennas without the need to adjust the order of the bits, wherein such adjustment is performed by adjusting the constellation, wherein the constellation is adjusted based on bit mapping relationship between the two transmissions, and in adopting in each transmission a different constellation to modulate symbols and then send them. The CoRe as described below applies to both of the approaches.

In Table 1, remapping version No. 0 corresponds to the constellation mapping mode at the first transmission, and remapping version No. 1 corresponds to the constellation mapping mode at the second transmission. In the first transmission, the bit transmitted by an antenna 1 is $b_0 b_1$ and the bit transmitted by an antenna 2 is $b_2 b_3$. In the second transmission, the antenna 1 transmits $b_3 b_2$ whose order is opposite to that of the bits sent by the antenna 2 in the first transmission, and the antenna 2 transmits $b_1 b_0$ and maps it, according to FIG. 1, in the order of $b_1 b_0$ whose order is opposite to that of the bits sent by the antenna 1 in the first transmission.

TABLE 1

| | QPSK Multi-Antenna Remapping | | | |
|---|---|---|---|---|
| | | Modulation Mapping Rules | | |
| Remapping Version | Symbol 1 | | Symbol 2 | |
| 0 | $b_0$ | $b_1$ | $b_2$ | $b_3$ |
| 1 | $b_3$ | $b_2$ | $b_1$ | $b_0$ |

When the existing method is used for the multi-antenna remapping, only antenna diversity is taken into consideration. Through the CoRe, an antenna different from that used in the first transmission is employed to send the bits. In such CoRe, only diversity is considered, but signals are not constructed from the view of two dimensions of space and time.

DISCLOSURE OF INVENTION

Technical Problem

It is an object of the present invention to provide a transmission method and apparatus for multi-antenna retransmission.

Solution to Problem

According to one aspect of the present invention, a transmission method for multi-antenna retransmission is provided, comprising steps of:

generating the bits to be transmitted by respective antennas;

mapping the bits to be transmitted by the respective antennas into symbols; and multiplying by a constant the vector constituted by the mapped symbols transmitted by multiple antennas, wherein the resulting vector is orthogonal to the matrix constituted by the symbols previously transmitted by multiple antennas, and transmitting the orthogonal symbols.

According to another aspect of the present invention, a transmission device for multi-antenna retransmission is provided, comprising:

an encoder for encoding information bits;

a constellation remapping bit generator for generating the bits to be transmitted by respective antennas;

a constellation remapping modulator for mapping the adjusted bits to be transmitted by the respective antennas into symbols; and a symbol allocation and transmission unit for transmitting the mapped symbols, wherein the vector constituted by the mapped symbols transmitted by multiple antennas is multiplied by a constant, wherein the resulting vector is orthogonal to the matrix constituted by the symbols previously transmitted by multiple antennas, and the orthogonal symbols are transmitted.

According to the method of the present invention, the remapped symbols transmitted by the respective antennas and the symbols previously transmitted by the respective antennas constitute a matrix. This matrix has an orthogonal property. The orthogonal property can be used to effectively detect signals. In addition, the method has a reception algorithm with low complexity and brings about significant performance gains over conventional methods.

Advantageous Effects of Invention

The present invention provides a structure of multi-antenna CoRe, which has following features: performing CoRe on a set of bits for transmission, remapping the bits transmitted by respective antennas in the $n^{th}$ transmission to obtain a symbol row vector, multiplying this row vector by a coefficient, and then placing the multiplication result as the $n^{th}$ row of a matrix, wherein the matrix thus constructed has an orthogonal property.

MODE FOR THE INVENTION

Figure 1:
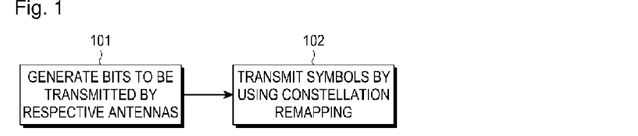
FIG. 1 illustrates a method for implementing the CoRe.

One implementation method of the present invention is shown in FIG. 1, comprising: 101 generating the bits to be transmitted by the respective antennas and then 102 mapping the bits to be transmitted by the respective antennas into symbols. The vector constituted by the mapped symbols transmitted by multiple antennas is multiplied by a constant, and the resulting vector is orthogonal to the matrix constituted by the symbols previously transmitted by multiple antennas. The orthogonal symbols are transmitted. The matrix constituted by the symbols previously transmitted by the multiple antennas may be the vector constituted by the symbols transmitted by the multiple antennas in the previous transmission. The previous transmission refers to a transmission which is temporally prior to the present transmission by one or more transmissions. The matrix constituted by the symbols previously transmitted by the plurality of antennas is the matrix constituted by the symbol vectors transmitted by multiple antennas in the previous N transmissions. The previous N transmissions refer to consecutive or inconsecutive N transmissions temporally prior to the present transmission. For example, for the $4^{th}$ transmission, the previous N transmissions may refer to the 2 transmissions of the $1^{st}$ and $3^{rd}$ or to the 3 transmissions of the $1^{st}$, $2^{nd}$ and $3^{rd}$.

Figure 2:
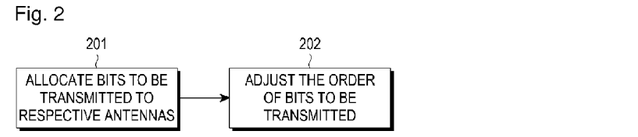
FIG. 2 illustrates a first method for generating the CoRe.
Figure 3:
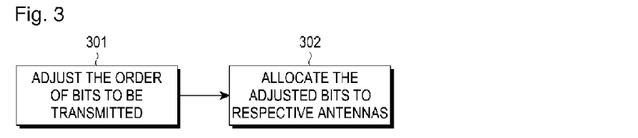
FIG. 3 illustrates a second method for generating the CoRe.

101 Generation of the bits to be transmitted by the respective antennas can be implemented by using two methods. A first method for generation is shown in FIG. 2, comprising: 201 allocating to multiple antennas the bits to be transmitted, and then 202 adjusting the order of the allocated bits. A second method for generation is shown in FIG. 3, comprising: 301 adjusting the order of bits, and then 302 allocating the adjusted bits to multiple antennas.

In the first method, adjusting the order of the bits comprises adjusting the order of the allocated bits or adjusting the order of constellation bit mapping. If the method of adjusting the order of the allocated bits is adopted and the adjusted bits are mapped, the same constellation is adopted in respective transmissions. If the method of adjusting constellation bit mapping is adopted, the constellation needs to be reconstructed.

Figure 4:
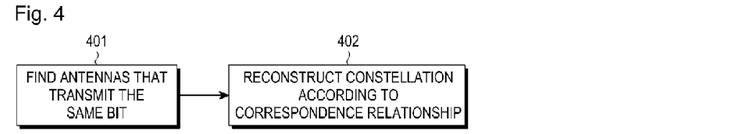
FIG. 4 illustrates construction of the constellation for a retransmission antenna based on CoRe Rules.
Figure 5:
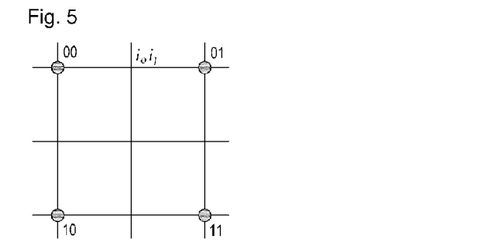
FIG. 5 illustrates a schematic diagram of a QPSK constellation.
Figure 6:
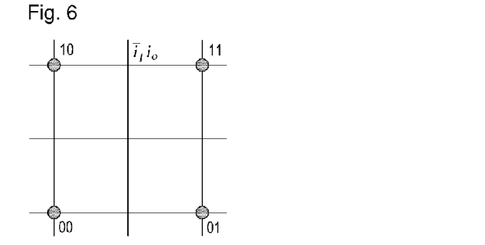
FIG. 6 illustrates a schematic diagram of a reconstructed QPSK constellation.

A method for reconstructing the constellation is shown in FIG. 4, comprising: firstly 401 finding an antenna k that transmits the same bit in the first transmission as that transmitted by an antenna j in the $i^{th}$ transmission, and then 402 reconfiguring the constellation based on relationship between the antenna j in the $i^{th}$ transmission and the antenna k in the first transmission to obtain a mapping graph. The processing of reconstruction consists in adjusting the order of constellation bits or performing a reverse operation on the constellation bits. Here, QPSK is used as an example to explain the constellation reconstruction. The mapping for QPSK is shown in FIG. 5. The mapping order of bits is $i_0 i_1$, where $i_0$ being 0 and 1 respectively corresponds to a constellation point in the right half plane and in the left half plane and $i_1$ being 0 and 1 respectively corresponds to a constellation point in the upper half plane and in the lower half plane. It is assumed that in the CoRe rules the bits transmitted by the antenna k in the first transmission are $b_0 b_1$ and the bits transmitted by the antenna j in the $i^{th}$ transmission are $\overline{b_1} b_0$. Then, after the constellation reconstruction, the mapping order of the constellation bits is $\overline{b_1} i_0$, where the upperline denotes reversion. The constellation as shown in FIG. 6 is thus obtained.

Figure 7:
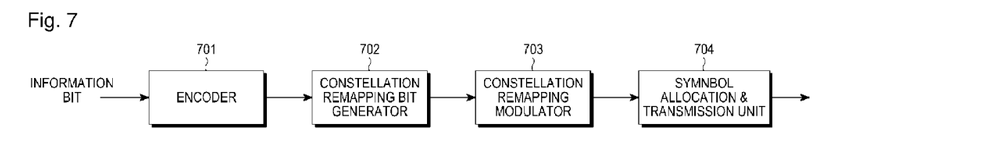
FIG. 7 illustrates a CoRe sender.

A device for implementing the present invention is shown in FIG. 7, comprising: an encoder 701 for outputting the information bit sequence to be transmitted, a CoRe bit generator 702 for generating the bits to be transmitted by the respective antennas, a CoRe modulator 703 for mapping the bits generated by the respective antennas into symbols, and a symbol allocation and transmission unit 704 for allocating and transmitting the mapped symbols. The vector constituted by the mapped symbols transmitted by multiple antennas is multiplied by a constant, and the resulting vector is orthogonal to the matrix constituted by the symbols previously transmitted by multiple antennas. The orthogonal symbols are transmitted. The matrix constituted by the symbols previously transmitted by the multiple antennas is the vector constituted by the symbols transmitted by the multiple antennas in the previous transmission. The previous transmission refers to a transmission which is temporally prior to the present transmission by one or more transmissions. The matrix constituted by the symbols previously transmitted by the multiple antennas is the matrix constituted by the symbol vectors transmitted by multiple antennas in the previous N transmissions. The previous N transmissions can be consecutive or inconsecutive N transmissions temporally prior to the present transmission. The module 702 can be implemented by the following two types of devices.

Figure 8:
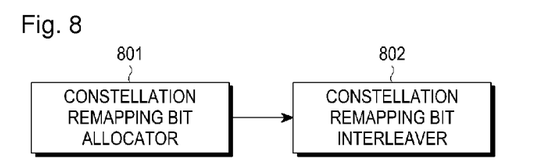
FIG. 8 illustrates a first CoRe generator.
Figure 9:
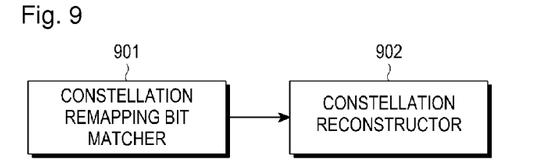
FIG. 9 illustrates a constellation reconstructor.

A first device for generation is shown in FIG. 8, comprises: a CoRe bit allocator 801 for allocating to the respective antennas the bits to be transmitted and a CoRe bit interleaver 802 for adjusting the order of the bits, wherein the step of adjusting comprises adjusting the order of the allocated bits or adjusting the order of constellation bit mapping. If the measure of adjusting the order of the allocated bits is adopted and the adjusted bits are mapped, the same constellation is adopted in respective transmissions. If the measure of adjusting constellation bit mapping is adopted, a construction method is shown in FIG. 9. The construction method comprises firstly 901 finding, by a CoRe bit matcher, an antenna k that transmits the same bit in the first transmission as that transmitted by an antenna j in the $i^{th}$ transmission, and then 902 reconfiguring the constellation, by a constellation reconstructor, based on relationship between the antenna j in the $i^{th}$ transmission and the antenna k in the first transmission to obtain a mapping graph. The processing of reconstruction comprises adjusting the order of constellation bits or performing a reverse operation on the constellation bits.

Figure 10:
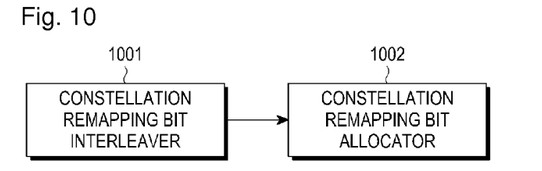
FIG. 10 illustrates a second CoRe generator.

A second device for generation is shown in FIG. 10, comprises: 1001 adjusting, by the CoRe bit interleaver, the order of the bits and 1002 allocating, by the CoRe bit allocator, to the respective antennas the bits to be transmitted.

Embodiments

Embodiment 1: A Retransmission with Two Antennas

The present embodiment is implemented as shown in Table 2. It is assumed that in the first transmission, an antenna 1 and an antenna 2 map bits to QPSK constellation points, respectively in the order of $b_0b_1$ and in the order of $b_2b_3$, for transmission. In the second transmission, the antenna 1 and the antenna 2 map bits into the QPSK constellation, respectively in the order of $b_3b_2$ and in the order of $\overline{b_1}$ $\overline{b_0}$ Herein, the upperline denotes a reverse operation, i.e., if $b_1$ is 1, after the reverse operation, $\overline{b_1}$ is zero. In the third retransmission, mapping can be performed in accordance with remapping version No. 0; in the fourth retransmission, mapping can be performed after allocation in accordance with remapping version No. 1; and the like.

TABLE 2

QPSK Multi-Antenna Remapping

| Remapping Version | Symbol 1 | | Symbol 2 | |
|---|---|---|---|---|
| 0 | $b_0$ | $b_1$ | $b_2$ | $b_3$ |
| 1 | $b_3$ | $b_2$ | $\overline{b_1}$ | $\overline{b_0}$ |

Embodiment 2: Two Retransmissions with Two Antennas

The present embodiment is implemented as shown in Table 3. It is assumed that in the first transmission, an antenna 1 and an antenna 2 map bits to QPSK constellation points, respectively in the order of $b_0b_1$ and in the order of $b_2b_3$, for transmission. In the second transmission, the antenna 1 and the antenna 2 map bits into the QPSK constellation, respectively in the order of $\overline{b_3}$ $\overline{b_2}$ and in the order of $b_1b_0$. Herein, the upperline denotes a reverse operation, i.e., if $b_1$ is 1, after the reverse operation, $\overline{b_1}$ is zero. In the third retransmission, mapping can be performed in accordance with remapping version No. 0; in the fourth retransmission, mapping can be performed in accordance with remapping version No. 1; and the like.

TABLE 3

QPSK Multi-Antenna Remapping

| Remapping Version | Symbol 1 | | Symbol 2 | |
|---|---|---|---|---|
| 0 | $b_0$ | $b_1$ | $b_2$ | $b_3$ |
| 1 | $\overline{b_3}$ | $\overline{b_2}$ | $b_1$ | $b_0$ |

Embodiment 3: A Retransmission with Two Antennas

The present embodiment is implemented as shown in Table 4. It is assumed that in the first transmission, an antenna 1 and an antenna 2 map bits to QPSK constellation points, respectively in the order of $b_0b_1$ and in the order of $b_2b_3$, for transmission. In the second transmission, the antenna 1 and the antenna 2 map bits into the QPSK constellation, respectively in the order of $\overline{b_2}$ $b_3$ and in the order of $b_0$ $\overline{b_1}$.

Herein, the upperline denotes a reverse operation, i.e., if $b_1$ is 1, after the reverse operation, $\overline{b_1}$ is zero. In the third retransmission, mapping can be performed in accordance with remapping version No. 0; in the fourth retransmission, mapping can be performed in accordance with remapping version No. 1; and the like.

TABLE 4

QPSK Multi-Antenna Remapping

| Remapping Version | Symbol 1 | | Symbol 2 | |
|---|---|---|---|---|
| 0 | $b_0$ | $b_1$ | $b_2$ | $b_3$ |
| 1 | $\overline{b_2}$ | $b_3$ | $b_0$ | $\overline{b_1}$ |

Embodiment 4: A Retransmission with Two Antennas

The present embodiment is implemented as shown in Table 5. It is assumed that in the first transmission, an antenna 1 and an antenna 2 map bits to QPSK constellation points, respectively in the order of $b_0b_1$ and in the order of $b_2b_3$, for transmission. In the second transmission, the antenna 1 and the antenna 2 map bits into the QPSK constellation, respectively in the order of $b_2$ $\overline{b_3}$ and in the order of $\overline{b_0}$ $b_1$. Herein, the upperline denotes a reverse operation, i.e., if $b_1$ is 1, after the reverse operation, $\overline{b_1}$ is zero. In the third retransmission, mapping can be performed in accordance with remapping version No. 0; in the fourth retransmission, mapping can be performed in accordance with remapping version No. 1; and the like.

TABLE 5

QPSK Multi-Antenna Remapping

| Remapping Version | Symbol 1 | | Symbol 2 | |
|---|---|---|---|---|
| 0 | $b_0$ | $b_1$ | $b_2$ | $b_3$ |
| 1 | $b_2$ | $\overline{b_3}$ | $\overline{b_0}$ | $b_1$ |

Embodiment 5A Retransmission with Two Antennas

The present embodiment is implemented as shown in Table 6. It is assumed that in the first transmission, an antenna 1 and an antenna 2 map bits to QPSK constellation points, respectively in the order of $b_0 b_1$ and in the order of $b_2 b_3$, for transmission. In the second transmission, the antenna 1 and the antenna 2 map bits into the QPSK constellation, respectively in the order of $\overline{b_3}$ $b_2$ and in the order of $\overline{b_1}$ $b_0$. Herein, the upperline denotes a reverse operation, i.e., if $b_1$ is 1, after the reverse operation, $\overline{b_1}$ is zero. In the third retransmission, mapping can be performed in accordance with remapping version No. 0; in the fourth retransmission, mapping can be performed after allocation in accordance with remapping version No. 1; and the like.

TABLE 6

QPSK Multi-Antenna Remapping

| Remapping Version | Modulation Mapping Rules | | | |
|---|---|---|---|---|
| | Symbol 1 | | Symbol 2 | |
| 0 | $b_0$ | $b_1$ | $b_2$ | $b_3$ |
| 1 | $\overline{b_3}$ | $b_2$ | $\overline{b_1}$ | $b_0$ |

Embodiment 6: A Retransmission with Two Antennas

The present embodiment is implemented as shown in Table 7. It is assumed that in the first transmission, an antenna 1 and an antenna 2 map bits to QPSK constellation points, respectively in the order of $b_0 b_1$ and in the order of $b_2 b_3$, for transmission. In the second transmission, the antenna 1 and the antenna 2 map bits into the QPSK constellation, respectively in the order of $b_3$ $\overline{b_2}$ and in the order of $b_1$ $\overline{b_0}$ Herein, the upperline denotes a reverse operation, i.e., if $b_1$ is 1, after the reverse operation, $\overline{b_1}$ is zero. In the third retransmission, mapping can be performed in accordance with remapping version No. 0; in the fourth retransmission, mapping can be performed after allocation in accordance with remapping version No. 1; and the like.

TABLE 7

QPSK Multi-Antenna Remapping

| Remapping Version | Modulation Mapping Rules | | | |
|---|---|---|---|---|
| | Symbol 1 | | Symbol 2 | |
| 0 | $b_0$ | $b_1$ | $b_2$ | $b_3$ |
| 1 | $b_3$ | $\overline{b_2}$ | $b_1$ | $\overline{b_0}$ |

Embodiment 7: A Retransmission with Two Antennas

The present embodiment is implemented as shown in Table 8. It is assumed that in the first transmission, an antenna 1 and an antenna 2 map bits to QPSK constellation points, respectively in the order of $b_0 b_1$ and in the order of $b_2 b_3$, for transmission. In the second transmission, the antenna 1 and the antenna 2 map bits into the QPSK constellation, respectively in the order of $b_2$ $\overline{b_3}$ and in the order of $b_0$ $\overline{b_1}$ Herein, the upperline denotes a reverse operation, i.e., if $b_1$ is 1, after the reverse operation, $\overline{b_1}$ is zero. In the third retransmission, mapping can be performed in accordance with remapping version No. 0; in the fourth retransmission, mapping can be performed after allocation in accordance with remapping version No. 1; and the like.

TABLE 8

QPSK Multi-Antenna Remapping

| Remapping Version | Modulation Mapping Rules | | | |
|---|---|---|---|---|
| | Symbol 1 | | Symbol 2 | |
| 0 | $b_0$ | $b_1$ | $b_2$ | $b_3$ |
| 1 | $b_2$ | $\overline{b_3}$ | $b_0$ | $\overline{b_1}$ |

Embodiment 8: A Retransmission with Two Antennas

The present embodiment is implemented as shown in Table 9. It is assumed that in the first transmission, an antenna 1 and an antenna 2 map bits to QPSK constellation points, respectively in the order of $b_0 b_1$ and in the order of $b_2 b_3$, for transmission. In the second transmission, the antenna 1 and the antenna 2 map bits into the QPSK constellation, respectively in the order of $\overline{b_2}$ $b_3$ and in the order of $\overline{b_0}$ $b_1$. Herein, the upperline denotes a reverse operation, i.e., if $b_1$ is 1, after the reverse operation, $\overline{b_1}$ is zero. In the third retransmission, mapping can be performed in accordance with remapping version No. 0; in the fourth retransmission, mapping can be performed after allocation in accordance with remapping version No. 1; and the like.

TABLE 9

QPSK Multi-Antenna Remapping

| Remapping Version | Modulation Mapping Rules | | | |
|---|---|---|---|---|
| | Symbol 1 | | Symbol 2 | |
| 0 | $b_0$ | $b_1$ | $b_2$ | $b_3$ |
| 1 | $\overline{b_2}$ | $b_3$ | $\overline{b_0}$ | $b_1$ |

Embodiment 9: A Retransmission with Two Antennas

The present embodiment is implemented as shown in Table 10. It is assumed that in the first transmission, an antenna 1 and an antenna 2 map bits to QPSK constellation points, respectively in the order of $b_0 b_1$ and in the order of $b_2 b_3$, for transmission. In the second transmission, the antenna 1 and the antenna 2 map bits into the QPSK constellation, respectively in the order of $b_3b_2$ and in the order of $\overline{b_0}\overline{b_1}$ Herein, the upperline denotes a reverse operation, i.e., if $b_1$ is 1, after the reverse operation, $\overline{b_1}$ is zero. In the third retransmission, mapping can be performed in accordance with remapping version No. 0; in the fourth retransmission, mapping can be performed after allocation in accordance with remapping version No. 1; and the like.

TABLE 10

QPSK Multi-Antenna Remapping

| Remapping Version | Modulation Mapping Rules | | | |
|---|---|---|---|---|
| | Symbol 1 | | Symbol 2 | |
| 0 | $b_0$ | $b_1$ | $b_2$ | $b_3$ |
| 1 | $b_3$ | $b_2$ | $\overline{b_0}$ | $\overline{b_1}$ |

Embodiment 10: Two Retransmissions with Two Antennas

The present embodiment is implemented as shown in Table 11. It is assumed that in the first transmission, an antenna 1 and an antenna 2 map bits to QPSK constellation points, respectively in the order of $b_0b_1$ and in the order of $b_2b_3$, for transmission. In the second transmission, the antenna 1 and the antenna 2 map bits into the QPSK constellation, respectively in the order of $\overline{b_3}$
$\overline{b_2}$ and in the order of $b_0b_1$. Herein, the upperline denotes a reverse operation, i.e., if $b_1$ is 1, after the reverse operation, $\overline{b_1}$ is zero. In the third retransmission, mapping can be performed in accordance with remapping version No. 0; in the fourth retransmission, mapping can be performed in accordance with remapping version No. 1; and the like.

TABLE 11

QPSK Multi-Antenna Remapping

| Remapping Version | Modulation Mapping Rules | | | |
|---|---|---|---|---|
| | Symbol 1 | | Symbol 2 | |
| 0 | $b_0$ | $b_1$ | $b_2$ | $b_3$ |
| 1 | $\overline{b_3}$ | $\overline{b_2}$ | $b_0$ | $b_1$ |

Embodiment 11: A Retransmission with Two Antennas

The present embodiment is implemented as shown in Table 12. It is assumed that in the first transmission, an antenna 1 and an antenna 2 map bits to QPSK constellation points, respectively in the order of $b_0b_1$ and in the order of $b_2b_3$, for transmission. In the second transmission, the antenna 1 and the antenna 2 map bits into the QPSK constellation, respectively in the order of $\overline{b_2}$
$b_3$ and in the order of
$\overline{b_1}$ $b_0$. Herein, the upperline denotes a reverse operation, i.e., if $b_1$ is 1, after the reverse operation, $\overline{b_1}$ is zero. In the third retransmission, mapping can be performed in accordance with remapping version No. 0; in the fourth retransmission, mapping can be performed in accordance with remapping version No. 1; and the like.

TABLE 12

QPSK Multi-Antenna Remapping

| Remapping Version | Modulation Mapping Rules | | | |
|---|---|---|---|---|
| | Symbol 1 | | Symbol 2 | |
| 0 | $b_0$ | $b_1$ | $b_2$ | $b_3$ |
| 1 | $\overline{b_2}$ | $b_3$ | $\overline{b_1}$ | $b_0$ |

Embodiment 12: A Retransmission with Two Antennas

The present embodiment is implemented as shown in Table 13. It is assumed that in the first transmission, an antenna 1 and an antenna 2 map bits to QPSK constellation points, respectively in the order of $b_0b_1$ and in the order of $b_2b_3$, for transmission. In the second transmission, the antenna 1 and the antenna 2 map bits into the QPSK constellation, respectively in the order of $b_2$ $\overline{b_3}$ and in the order of $b_1$ $\overline{b_0}$ Herein, the upperline denotes a reverse operation, i.e., if $b_1$ is 1, after the reverse operation, $\overline{b_1}$ is zero. In the third retransmission, mapping can be performed in accordance with remapping version No. 0; in the fourth retransmission, mapping can be performed in accordance with remapping version No. 1; and the like.

TABLE 13

QPSK Multi-Antenna Remapping

| Remapping Version | Modulation Mapping Rules | | | |
|---|---|---|---|---|
| | Symbol 1 | | Symbol 2 | |
| 0 | $b_0$ | $b_1$ | $b_2$ | $b_3$ |
| 1 | $b_2$ | $\overline{b_3}$ | $b_1$ | $\overline{b_0}$ |

Embodiment 13: A Retransmission with Two Antennas

The present embodiment is implemented as shown in Table 14. It is assumed that in the first transmission, an antenna 1 and an antenna 2 map bits to QPSK constellation points, respectively in the order of $b_0b_1$ and in the order of $b_2b_3$, for transmission. In the second transmission, the antenna 1 and the antenna 2 map bits into the QPSK constellation, respectively in the order of $\overline{b_3}$ $b_2$ and in the order of $b_0$ $\overline{b_1}$ Herein, the upperline denotes a reverse operation, i.e., if $b_1$ is 1, after the reverse operation, $\overline{b_1}$ is zero. In the third retransmission, mapping can be performed in accordance with remapping version No. 0; in the fourth retransmission, mapping can be performed after allocation in accordance with remapping version No. 1; and the like.

TABLE 14

QPSK Multi-Antenna Remapping

| Remapping Version | Modulation Mapping Rules | | | |
|---|---|---|---|---|
| | Symbol 1 | | Symbol 2 | |
| 0 | $b_0$ | $b_1$ | $b_2$ | $b_3$ |
| 1 | $\overline{b_3}$ | $b_2$ | $b_0$ | $\overline{b_1}$ |

Embodiment 14: A Retransmission with Two Antennas

The present embodiment is implemented as shown in Table 15. It is assumed that in the first transmission, an antenna 1 and an antenna 2 map bits to QPSK constellation points, respectively in the order of $b_0 b_1$ and in the order of $b_2 b_3$, for transmission. In the second transmission, the antenna 1 and the antenna 2 map bits into the QPSK constellation, respectively in the order of $b_3$ $\overline{b_2}$ and in the order of $\overline{b_0}$ $b_1$. Herein, the upperline denotes a reverse operation, i.e., if $b_1$ is 1, after the reverse operation, $\overline{b_1}$ is zero. In the third retransmission, mapping can be performed in accordance with remapping version No. 0; in the fourth retransmission, mapping can be performed after allocation in accordance with remapping version No. 1; and the like.

TABLE 15

QPSK Multi-Antenna Remapping

| Remapping Version | Modulation Mapping Rules | | | |
|---|---|---|---|---|
| | Symbol 1 | | Symbol 2 | |
| 0 | $b_0$ | $b_1$ | $b_2$ | $b_3$ |
| 1 | $b_3$ | $\overline{b_2}$ | $\overline{b_0}$ | $b_1$ |

Embodiment 15: A Retransmission with Two Antennas

The present embodiment is implemented as shown in Table 16. It is assumed that in the first transmission, an antenna 1 and an antenna 2 map bits to QPSK constellation points, respectively in the order of $b_0 b_1$ and in the order of $b_2 b_3$, for transmission. In the second transmission, the antenna 1 and the antenna 2 map bits into the QPSK constellation, respectively in the order of $b_2$ $\overline{b_3}$ and in the order of $\overline{b_1}$ $b_0$. Herein, the upperline denotes a reverse operation, i.e., if $b_1$ is 1, after the reverse operation, $\overline{b_1}$ is zero. In the third retransmission, mapping can be performed in accordance with remapping version No. 0; in the fourth retransmission, mapping can be performed after allocation in accordance with remapping version No. 1; and the like.

TABLE 16

QPSK Multi-Antenna Remapping

| Remapping Version | Modulation Mapping Rules | | | |
|---|---|---|---|---|
| | Symbol 1 | | Symbol 2 | |
| 0 | $b_0$ | $b_1$ | $b_2$ | $b_3$ |
| 1 | $b_2$ | $\overline{b_3}$ | $\overline{b_1}$ | $b_0$ |

Embodiment 16: A Retransmission with Two Antennas

The present embodiment is implemented as shown in Table 17. It is assumed that in the first transmission, an antenna 1 and an antenna 2 map bits to QPSK constellation points, respectively in the order of $b_0 b_1$ and in the order of $b_2 b_3$, for transmission. In the second transmission, the antenna 1 and the antenna 2 map bits into the QPSK constellation, respectively in the order of $\overline{b_2}$ $b_3$ and in the order of $b_1$ $\overline{b_0}$ Herein, the upperline denotes a reverse operation, i.e., if $b_1$ is 1, after the reverse operation, $\overline{b_1}$ is zero. In the third retransmission, mapping can be performed in accordance with remapping version No. 0; in the fourth retransmission, mapping can be performed after allocation in accordance with remapping version No. 1; and the like.

TABLE 17

QPSK Multi-Antenna Remapping

| Remapping Version | Modulation Mapping Rules | | | |
|---|---|---|---|---|
| | Symbol 1 | | Symbol 2 | |
| 0 | $b_0$ | $b_1$ | $b_2$ | $b_3$ |
| 1 | $\overline{b_2}$ | $b_3$ | $b_1$ | $\overline{b_0}$ |

Embodiment 17: A Retransmission with Two Antennas

The present embodiment is implemented as shown in Table 18. It is assumed that in the first transmission, an antenna 1 and an antenna 2 map bits to 16QAM constellation points, respectively in the order of $b_0 b_1 b_2 b_3$ and in the order of $b_4 b_5 b_6 b_7$, for transmission. In the second transmission, the antenna 1 and the antenna 2 map bits into the 16QAM constellation, respectively in the order of $b_6 b_7 b_4 b_5$ and in the order of $\overline{b_2}$ $\overline{b_3}$ $\overline{b_0}$ $\overline{b_1}$ Herein, the upperline denotes a reverse operation, i.e., if $b_1$ is 1, after the reverse operation, $\overline{b_1}$ is zero. In the third retransmission, mapping can be performed in accordance with remapping version No. 0; in the fourth retransmission, mapping can be performed after allocation in accordance with remapping version No. 1; and the like.

TABLE 18

16 QAM Multi-Antenna Remapping

| Remapping Version | Modulation Mapping Rules | | | |
|---|---|---|---|---|
| | Symbol 1 | | Symbol 2 | |
| 0 | $b_0 b_1$ | $b_2 b_3$ | $b_4 b_5$ | $b_6 b_7$ |
| 1 | $b_6 b_7$ | $b_4 b_5$ | $\overline{b_2}\overline{b_3}$ | $\overline{b_0}\overline{b_1}$ |

Embodiment 18: Two Retransmissions with Two Antennas

The present embodiment is implemented as shown in Table 19. It is assumed that in the first transmission, an antenna 1 and an antenna 2 map bits to 16QAM constellation points, respectively in the order of $b_0 b_1 b_2 b_3$ and in the order of $b_4 b_5 b_6 b_7$, for transmission. In the second transmission, the antenna 1 and the antenna 2 map bits into the 16QAM constellation, respectively in the order of
$\overline{b_6}\overline{b_7}$
$\overline{b_4}\overline{b_5}$
and in the order of $b_2 b_3 b_0 b_1$. Herein, the upperline denotes a reverse operation, i.e., if $b_1$ is 1, after the reverse operation,
$\overline{b_1}$
is zero. In the third retransmission, mapping can be performed in accordance with remapping version No. 0; in the fourth retransmission, mapping can be performed in accordance with remapping version No. 1; and the like.

TABLE 19

16 QAM Multi-Antenna Remapping

| Remapping Version | Modulation Mapping Rules | | | |
|---|---|---|---|---|
| | Symbol 1 | | Symbol 2 | |
| 0 | $b_0 b_1$ | $b_2 b_3$ | $b_4 b_5$ | $b_6 b_7$ |
| 1 | $\overline{b_6}\overline{b_7}$ | $\overline{b_4}\overline{b_5}$ | $b_2 b_3$ | $b_0 b_1$ |

Embodiment 19: A Retransmission with Two Antennas

The present embodiment is implemented as shown in Table 20. It is assumed that in the first transmission, an antenna 1 and an antenna 2 map bits to 16QAM constellation points, respectively in the order of $b_0 b_1 b_2 b_3$ and in the order of $b_4 b_5 b_6 b_7$, for transmission. In the second transmission, the antenna 1 and the antenna 2 map bits into the 16QAM constellation, respectively in the order of
$\overline{b_4}\overline{b_5}$
$b_6 b_7$ and in the order of $b_0 b_1$
$\overline{b_2}\overline{b_3}$
Herein, the upperline denotes a reverse operation, i.e., if $b_1$ is 1, after the reverse operation,
$\overline{b_1}$
is zero. In the third retransmission, mapping can be performed in accordance with remapping version No. 0; in the fourth retransmission, mapping can be performed in accordance with remapping version No. 1; and the like.

TABLE 20

16 QAM Multi-Antenna Remapping

| Remapping Version | Modulation Mapping Rules | | | |
|---|---|---|---|---|
| | Symbol 1 | | Symbol 2 | |
| 0 | $b_0 b_1$ | $b_2 b_3$ | $b_4 b_5$ | $b_6 b_7$ |
| 1 | $\overline{b_4}\overline{b_5}$ | $b_6 b_7$ | $b_0 b_1$ | $\overline{b_2}\overline{b_3}$ |

Embodiment 20: A Retransmission with Two Antennas

The present embodiment is implemented as shown in Table 21. It is assumed that in the first transmission, an antenna 1 and an antenna 2 map bits to 16QAM constellation points, respectively in the order of $b_0 b_1 b_2 b_3$ and in the order of $b_4 b_5 b_6 b_7$, for transmission. In the second transmission, the antenna 1 and the antenna 2 map bits into the 16QAM constellation, respectively in the order of $b_4 b_5$
$\overline{b_6}\overline{b_7}$
and in the order of
$\overline{b_0}\overline{b_1}$
$b_2 b_3$. Herein, the upperline denotes a reverse operation, i.e., if $b_1$ is 1, after the reverse operation,
$\overline{b_1}$
is zero. In the third retransmission, mapping can be performed in accordance with remapping version No. 0; in the fourth retransmission, mapping can be performed in accordance with remapping version No. 1; and the like.

TABLE 21

16 QAM Multi-Antenna Remapping

| Remapping Version | Modulation Mapping Rules | | | |
|---|---|---|---|---|
| | Symbol 1 | | Symbol 2 | |
| 0 | $b_0 b_1$ | $b_2 b_3$ | $b_4 b_5$ | $b_6 b_7$ |
| 1 | $b_4 b_5$ | $\overline{b_6}\overline{b_7}$ | $\overline{b_0}\overline{b_1}$ | $b_2 b_3$ |

Embodiment 21: A Retransmission with Two Antennas

The present embodiment is implemented as shown in Table 22. It is assumed that in the first transmission, an antenna 1 and an antenna 2 map bits to 64QAM constellation points, respectively in the order of $b_0 b_1 b_2 b_3 b_4 b_5$ and in the order of $b_6 b_7 b_8 b_9 b_{10} b_{11}$, for transmission. In the second transmission, the antenna 1 and the antenna 2 map bits into the 64QAM constellation, respectively in the order of $b_9 b_{10} b_{11} b_6 b_7 b_8$ and in the order of
$\overline{b_3}\overline{b_4}\overline{b_5}$
$\overline{b_0}\overline{b_1}\overline{b_2}$
. Herein, the upperline denotes a reverse operation, i.e., if $b_1$ is 1, after the reverse operation,
$\overline{b_1}$
is zero. In the third retransmission, mapping can be performed in accordance with remapping version No. 0; in the fourth retransmission, mapping can be performed after allocation in accordance with remapping version No. 1; and the like.

TABLE 22

64 QAM Multi-Antenna Remapping

| Remapping Version | Modulation Mapping Rules | | | |
|---|---|---|---|---|
| | Symbol 1 | | Symbol 2 | |
| 0 | $b_0 b_1 b_2$ | $b_3 b_4 b_5$ | $b_6 b_7 b_8$ | $b_9 b_{10} b_{11}$ |
| 1 | $b_9 b_{10} b_{11}$ | $b_6 b_7 b_8$ | $\overline{b_3}\overline{b_4}\overline{b_5}$ | $\overline{b_0}\overline{b_1}\overline{b_2}$ |

Embodiment 22: Two Retransmissions with Two Antennas

The present embodiment is implemented as shown in Table 23. It is assumed that in the first transmission, an antenna 1 and an antenna 2 map bits to 64QAM constellation points, respectively in the order of $b_0 b_1 b_2 b_3 b_4 b_5$ and in the order of $b_6 b_7 b_8 b_9 b_{10} b_{11}$, for transmission. In the second transmission, the antenna 1 and the antenna 2 map bits into the 64QAM constellation, respectively in the order of $\overline{b_6}b_7\overline{b_8}$
$\overline{b_9}b_{10}\overline{b_{11}}$
and in the order of $b_3b_4b_5b_0b_1b_2$. Herein, the upperline denotes a reverse operation, i.e., if $b_1$ is 1, after the reverse operation,
$\overline{b_1}$
is zero. In the third retransmission, mapping can be performed in accordance with remapping version No. 0; in the fourth retransmission, mapping can be performed in accordance with remapping version No. 1; and the like.

TABLE 23

64 QAM Multi-Antenna Remapping

| Remapping | Modulation Mapping Rules | | | |
|---|---|---|---|---|
| Version | Symbol 1 | | Symbol 2 | |
| 0 | $b_0b_1b_2$ | $b_3b_4b_5$ | $b_6b_7b_8$ | $b_9b_{10}b_{11}$ |
| 1 | $\overline{b_9}b_{10}\overline{b_{11}}$ | $\overline{b_6}b_7\overline{b_8}$ | $b_3b_4b_5$ | $b_0b_1b_2$ |

Embodiment 23: A Retransmission with Two Antennas

The present embodiment is implemented as shown in Table 24. It is assumed that in the first transmission, an antenna 1 and an antenna 2 map bits to 64QAM constellation points, respectively in the order of $b_0b_1b_2b_3b_4b_5$ and in the order of $b_6b_7b_8b_9b_{10}b_{11}$, for transmission. In the second transmission, the antenna 1 and the antenna 2 map bits into the 64QAM constellation, respectively in the order of
$\overline{b_6}b_7\overline{b_8}$
$b_9b_{10}b_{11}$ and in the order of $b_0b_1b_2$
$b_3b_4b_5$ Herein, the upperline denotes a reverse operation, i.e., if $b_1$ is 1, after the reverse operation,
$\overline{b_1}$
is zero. In the third retransmission, mapping can be performed in accordance with remapping version No. 0; in the fourth retransmission, mapping can be performed in accordance with remapping version No. 1; and the like.

TABLE 24

64 QAM Multi-Antenna Remapping

| Remapping | Modulation Mapping Rules | | | |
|---|---|---|---|---|
| Version | Symbol 1 | | Symbol 2 | |
| 0 | $b_0b_1b_2$ | $b_3b_4b_5$ | $b_6b_7b_8$ | $b_9b_{10}b_{11}$ |
| 1 | $\overline{b_6}b_7\overline{b_8}$ | $b_9b_{10}b_{11}$ | $b_0b_1b_2$ | $\overline{b_3}b_4\overline{b_5}$ |

Embodiment 24: A Retransmission with Two Antennas

The present embodiment is implemented as shown in Table 25. It is assumed that in the first transmission, an antenna 1 and an antenna 2 map bits to 64QAM constellation points, respectively in the order of $b_0b_1b_2b_3b_4b_5$ and in the order of $b_6b_7b_8b_9b_{10}b_{11}$, for transmission. In the second transmission, the antenna 1 and the antenna 2 map bits into the 64QAM constellation, respectively in the order of $b_6b_7b_8$
$\overline{b_9}b_{10}\overline{b_{11}}$
and in the order of
$\overline{b_0}b_1\overline{b_2}$
$b_3b_4b_5$. Herein, the upperline denotes a reverse operation, i.e., if $b_1$ is 1, after the reverse operation,
$\overline{b_1}$
is zero. In the third retransmission, mapping can be performed in accordance with remapping version No. 0; in the fourth retransmission, mapping can be performed in accordance with remapping version No. 1; and the like.

TABLE 25

64 QAM Multi-Antenna Remapping

| Remapping | Modulation Mapping Rules | | | |
|---|---|---|---|---|
| Version | Symbol 1 | | Symbol 2 | |
| 0 | $b_0b_1b_2$ | $b_3b_4b_5$ | $b_6b_7b_8$ | $b_9b_{10}b_{11}$ |
| 1 | $b_6b_7b_8$ | $\overline{b_9}b_{10}\overline{b_{11}}$ | $\overline{b_0}b_1\overline{b_2}$ | $b_3b_4b_5$ |

Embodiment 25: A Retransmission with Four Antennas

The present embodiment is implemented as shown in Table 26. It is assumed that in the first transmission, an antenna 1, an antenna 2, an antenna 3 and an antenna 4 map bits to QPSK constellation points, respectively in the order of $b_0b_1$, in the order of $b_2b_3$, in the order of $b_4b_5$ and in the order of $b_6b_7$, for transmission. In the second transmission, the antenna 1, the antenna 2, the antenna 3 and the antenna 4 map bits into the QPSK constellation, respectively in the order of
$\overline{b_2}b_3$,
in the order of
$b_0\overline{b_1}$,
in the order of
$\overline{b_6}b_7$
and in the order of
$b_4\overline{b_5}$,
for transmission. In the third transmissions, the antenna 1, the antenna 2, the antenna 3 and the antenna 4 map bits to QPSK constellation points, respectively in the order of $b_4b_5$, in the order of $b_6b_7$, in the order of $b_0b_1$ and in the order of $b_2b_3$, for transmission. In the fourth transmission, the antenna 1, the antenna 2, the antenna 3 and the antenna 4 map bits into the QPSK constellation, respectively in the order of
$\overline{b_6}b_7$,
in the order of
$b_4\overline{b_5}$,
in the order of
$\overline{b_2}b_3$
and in the order of
$b_0\overline{b_1}$,
for transmission. Herein, the upperline denotes a reverse operation, i.e., if $b_1$ is 1, after the reverse operation,
$\overline{b_1}$
is zero.

TABLE 26

QPSK Multi-Antenna Remapping

| Remapping | Modulation Mapping Rules | | | | | | | |
|---|---|---|---|---|---|---|---|---|
| Version | Symbol 1 | | Symbol 2 | | Symbol 3 | | Symbol 4 | |
| 0 | $b_0$ | $b_1$ | $b_2$ | $b_3$ | $b_4$ | $b_5$ | $b_6$ | $b_7$ |
| 1 | $\overline{b_2}$ | $b_3$ | $b_0$ | $\overline{b_1}$ | $\overline{b_6}$ | $b_7$ | $b_4$ | $\overline{b_5}$ |
| 2 | $b_4$ | $b_5$ | $b_6$ | $b_7$ | $b_0$ | $b_1$ | $b_2$ | $b_3$ |
| 3 | $\overline{b_6}$ | $b_7$ | $b_4$ | $\overline{b_5}$ | $\overline{b_2}$ | $b_3$ | $b_0$ | $\overline{b_1}$ |

The above Embodiments 1~24 can be extended to cases of four antennas based on the above method of block-based extension. This method of block-based extension is described as follows:

the Symbol 1 transmitted by the antenna 1 in the case of version No. 0 for four antennas corresponds to the Symbol 1 transmitted by the antenna 1 in the case of version No. 0 of the Embodiments 1~24;

the Symbol 2 transmitted by the antenna 2 in the case of version No. 0 for four antennas corresponds to the Symbol 2 transmitted by the antenna 2 in the case of version No. 0 of the Embodiments 1~24;

the Symbol 1 transmitted by the antenna 1 in the case of version No. 1 for four antennas corresponds to the Symbol 1 transmitted by the antenna 1 in the case of version No. 1 of the Embodiments 1~24;

the Symbol 2 transmitted by the antenna 2 in the case of version No. 1 for four antennas corresponds to the Symbol 2 transmitted by the antenna 2 in the case of version No. 1 of the Embodiments 1~24;

the Symbol 3 transmitted by the antenna 3 in the case of version No. 0 for four antennas corresponds to the Symbol 1 transmitted by the antenna 1 in the case of version No. 0 of the Embodiments 1~24;

the Symbol 4 transmitted by the antenna 4 in the case of version No. 0 for four antennas corresponds to the Symbol 2 transmitted by the antenna 2 in the case of version No. 0 of the Embodiments 1~24;

the Symbol 3 transmitted by the antenna 3 in the case of version No. 1 for four antennas corresponds to the Symbol 1 transmitted by the antenna 1 in the case of version No. 1 of the Embodiments 1~24;

the Symbol 4 transmitted by the antenna 4 in the case of version No. 1 for four antennas corresponds to the Symbol 2 transmitted by the antenna 2 in the case of version No. 1 of the Embodiments 1~24;

the Symbol 1 transmitted by the antenna 1 in the case of version No. 2 for four antennas corresponds to the Symbol 1 transmitted by the antenna 1 in the case of version No. 0 of the Embodiments 1~24;

the Symbol 2 transmitted by the antenna 2 in the case of version No. 2 for four antennas corresponds to the Symbol 2 transmitted by the antenna 2 in the case of version No. 0 of the Embodiments 1~24;

the Symbol 1 transmitted by the antenna 1 in the case of version No. 3 for four antennas corresponds to the Symbol 1 transmitted by the antenna 1 in the case of version No. 1 of the Embodiments 1~24;

the Symbol 2 transmitted by the antenna 2 in the case of version No. 3 for four antennas corresponds to the Symbol 2 transmitted by the antenna 2 in the case of version No. 1 of the Embodiments 1~24;

the Symbol 3 transmitted by the antenna 3 in the case of version No. 2 for four antennas corresponds to the Symbol 1 transmitted by the antenna 1 in the case of version No. 0 of the Embodiments 1~24;

the Symbol 4 transmitted by the antenna 4 in the case of version No. 2 for four antennas corresponds to the Symbol 2 transmitted by the antenna 2 in the case of version No. 0 of the Embodiments 1~24;

the Symbol 3 transmitted by the antenna 3 in the case of version No. 3 for four antennas corresponds to the Symbol 1 transmitted by the antenna 1 in the case of version No. 1 of the Embodiments 1~24; and the Symbol 4 transmitted by the antenna 4 in the case of version No. 3 for four antennas corresponds to the Symbol 2 transmitted by the antenna 2 in the case of

The invention claimed is:

1. A transmission method for multiple antennas, comprising:
    generating bits to be transmitted by respective antennas;
    mapping the bits to be transmitted by the respective antennas into symbols;
    multiplying, by a constant, a vector constituted by the symbols to generate a resulting vector; and
    transmitting symbols of the resulting vector by using the multiple antennas,
    wherein the resulting vector is orthogonal to a matrix constituted by symbols previously transmitted by the multiple antennas, and
    wherein for retransmission of the symbols of the resulting vector with antenna 1 and antenna 2 of the multiple antennas:
    in a first transmission of the symbols of the resulting vector, the antenna 1 and an antenna 2 transmit bits, $b_0$, $b_1$, $b_2$, $b_3$, of the symbols of the resulting vector remapped to QPSK constellation points in an order of $b_0 b_1$ and of $b_2 b_3$, respectively;
    in a second transmission, the antenna 1 and the antenna 2 transmit the bits, $b_0$, $b_1$, $b_2$, $b_3$, of the symbols of the resulting vector remapped to the QPSK constellation in an order of $\overline{b_3}\,\overline{b_2}$ and of $b_0 b_1$, respectively wherein $\overline{b_3}$, $\overline{b_2}$ is a reversion of bit $b_3$ and $b_2$;
    in the first transmission, the remapping of the bits of the symbols of the resulting vector is performed in accordance with a first remapping version; and
    in the second transmission, the remapping of the bits of the symbols of the resulting vector is performed in accordance with a second remapping version,
    wherein modulation mapping rules of the first remapping version and the second remapping version of the first transmission and second transmissions are:

| Remapping Version | Modulation Mapping Rules | | | |
| --- | --- | --- | --- | --- |
| | Symbol 1 | | Symbol 2 | |
| 0 | $b_0$ | $b_1$ | $b_2$ | $b_3$ |
| 1 | $\overline{b_3}$ | $\overline{b_2}$ | $b_0$ | $b_1$. |

2. The method of claim 1, wherein the matrix constituted by the symbols is a vector constituted by the symbols transmitted by the multiple antennas.

3. The method of claim 2, wherein a transmission of the matrix is temporally prior to the transmitting of the symbols of the resulting vector.

4. The method of claim 1, wherein the matrix constituted by the symbols is a matrix constituted by symbol vectors transmitted by the multiple antennas in N previous transmissions.

5. The method of claim 4, wherein the N previous transmissions are consecutive or inconsecutive N transmissions temporally prior to the transmission of the resulting vector.

6. The method of claim 1, wherein the generating of the bits to be transmitted comprises allocating the bits to be transmitted to the multiple antennas and adjusting an order of the allocated bits.

7. The method of claim 6, wherein the adjusting of the order of the allocated bits comprises adjusting an order of the allocated bits or adjusting an order of constellation bit mapping.

8. The method of claim 1, wherein the generating of the bits to be transmitted comprises adjusting an order of the bits to be transmitted and allocating the bits to be transmitted to multiple antennas.

9. A transmission device for multiple antennas, comprising:
    an encoder encoding bits to be transmitted;
    a bit generator generating bits to be transmitted by respective antennas, using the encoded bits;

a modulator mapping adjusted bits to be transmitted by the respective antennas into symbols; and a transmission unit multiplying, by a constant, a vector constituted by the symbols to generate a resulting vector, and transmitting the resulting vector by using the multiple antennas, wherein the resulting vector is orthogonal to a matrix constituted by symbols, and wherein for retransmission of the symbols of the resulting vector with antenna 1 and antenna 2 of the multiple antennas:

in a first transmission of the symbols of the resulting vector, the antenna 1 and an antenna 2 transmit bits, $b_0$, $b_1$, $b_2$, $b_3$, of the symbols of the resulting vector remapped to QPSK constellation points in an order of $b_0 b_1$ and of $b_2 b_3$, respectively;

in a second transmission, the antenna 1 and the antenna 2 transmit the bits, $b_0, b_1$, $b_2$, $b_3$, of the symbols of the resulting vector remapped to the QPSK constellation in an order of $\overline{b_3}\, \overline{b_2}$ and of $b_0 b_1$, respectively, wherein $\overline{b_3}, \overline{b_2}$ is a reversion of bit $b_3$ and $b_2$;

in the first transmission, the remapping of the bits of the symbols of the resulting vector is performed in accordance with a first remapping version; and in the second transmission, the remapping of the bits of the symbols of the resulting vector is performed in accordance with a second remapping version, wherein modulation mapping rules of the first remapping version and the second remapping version of the first transmission and second transmission are:

| Remapping Version | Modulation Mapping Rules | | | |
|---|---|---|---|---|
| | Symbol 1 | | Symbol 2 | |
| 0 | $b_0$ | $b_1$ | $b_2$ | $b_3$ |
| 1 | $\overline{b_3}$ | $\overline{b_2}$ | $b_0$ | $b_1$. |

* * * * *